United States Patent
Lenz

[11] 3,897,638
[45] Aug. 5, 1975

[54] SEQUENCE BATCH DRYING METHOD

[76] Inventor: Lowell J. Lenz, New Highway 29 North, Alexandria, Minn. 56308

[22] Filed: July 17, 1974

[21] Appl. No.: 489,260

Related U.S. Application Data

[62] Division of Ser. No. 323,915, Jan. 15, 1973, Pat. No. 3,837,088.

[52] U.S. Cl. .............................. 34/13; 34/26; 34/29
[51] Int. Cl.² .......................... F26B 7/00; F26B 3/00
[58] Field of Search .............. 34/64, 65, 13, 26, 28, 34/29, 38, 174

[56] References Cited
UNITED STATES PATENTS

| | | | |
|---|---|---|---|
| 1,276,044 | 8/1918 | Ellis | 34/174 |
| 1,533,388 | 4/1925 | Chapman | 34/174 X |

*Primary Examiner*—John J. Camby

[57] ABSTRACT

A method and apparatus operable to dry particulate material, as corn, small grains, beans, rice, nuts and seeds, having a housing enclosing a plurality of separate columns of particulate material. Hot air directed to the columns sequentially flows through the particulate material in each column. Exhaust passages associated with separate columns have dampers to selectively permit the flow of air through a passage and block the flow of air through the passage to allow sequential flow of air through the columns. Located above the columns is a wet grain holding section for discharging particulate material into the columns. A dry grain holding section is located below the columns for receiving dried particulate material from the columns. Movable doors control the flow of particulate material into and out of the columns.

13 Claims, 6 Drawing Figures

SEQUENCE BATCH DRYING METHOD

CROSS REFERENCE TO RELATED APPLICATION

This application is a division of U.S. application Ser. No. 323,915 filed Jan. 15, 1973, now U.S. Pat. No. 3,837,088.

BACKGROUND OF THE INVENTION

Automatic dryers for particulate materials, as agricultural grains and diatomaceous earth, are described in U.S. Pat. Nos. 645,366; 987,837 and 1,482,812. Numerous improvements in dryers and methods of drying have been developed to automatically dry particulate materials, especially grains, in a faster and more efficient manner.

Agricultural practices are utilizing more of the growing season to produce a mature crop. This reduces the natural drying time of the crop in the field. Grain crops are stored for relatively long periods of time. This requires that the moisture content of the crop be controlled to prevent spoilage.

Automatic batch-type dryers have housing structure to hold a given number of bushels of grain. Hot air is moved through the grain to remove moisture from the grain. When the grain is of the desired moisture content, cool air is passed through the grain. The dried and cooled grain is then discharged to a storage area. The greatest capacity of a batch dryer is achieved when there is a maximum temperature of the heated air that will not cause burning. To remove a high amount of moisture from wet grain, it is necessary to increase the time that the hot air is moved through the grain. By increasing the time, the drying capacity of the dryer is reduced and the power requirements are increased.

SUMMARY OF INVENTION

The invention relates to a method and apparatus for drying particulate materials, as corn, small grains, beans, rice, nuts, seeds and the like. Specifically, the invention relates to a sequence batch dryer having a housing with a plurality of grain drying columns or spaces in communication with passages for carrying air to and from the grain drying columns. Separate control means operate to block the exhaust or exit passages for the air in a sequential manner whereby heated air is free to move through the grain drying columns or accumulate in the grain drying column to pick up the maximum amount of moisture from the grain.

The efficiency of the drying apparatus is increased by use of a wet holding section above the drying columns. A dry holding section is located below the drying columns. Separate doors or gate means are used to control the flow of grain from the wet holding section into the drying column and from the drying column into the dry holding section.

In terms of method, the invention is directed to a process of drying particulate material comprising storing particulate material in first and second columns. Hot air is directed to the first and second columns. The hot air is permitted sequential flow through the first column and then through the second column to dry the particulate materials in the columns. After the material in the columns is dry, cool air is passed through the columns to lower the temperature of the material.

An object of the invention is to provide a batch-type grain dryer that has a high drying capacity and relatively low horsepower requirements. A further object of the invention is to provide a grain dryer that sequentially dries separate columns of grain by sequentially blocking and permitting the flow of hot air through the grain. A still further object of the invention is to provide a batch-type dryer that confines the air to the housing during loading and unloading of the dryer and thereby provides a minimum of emissions of dust and pollutants to the environment. Another object of the invention is to provide a batch dryer for drying grain that has maximum fire safety characteristics.

IN THE DRAWINGS

Figure 1:
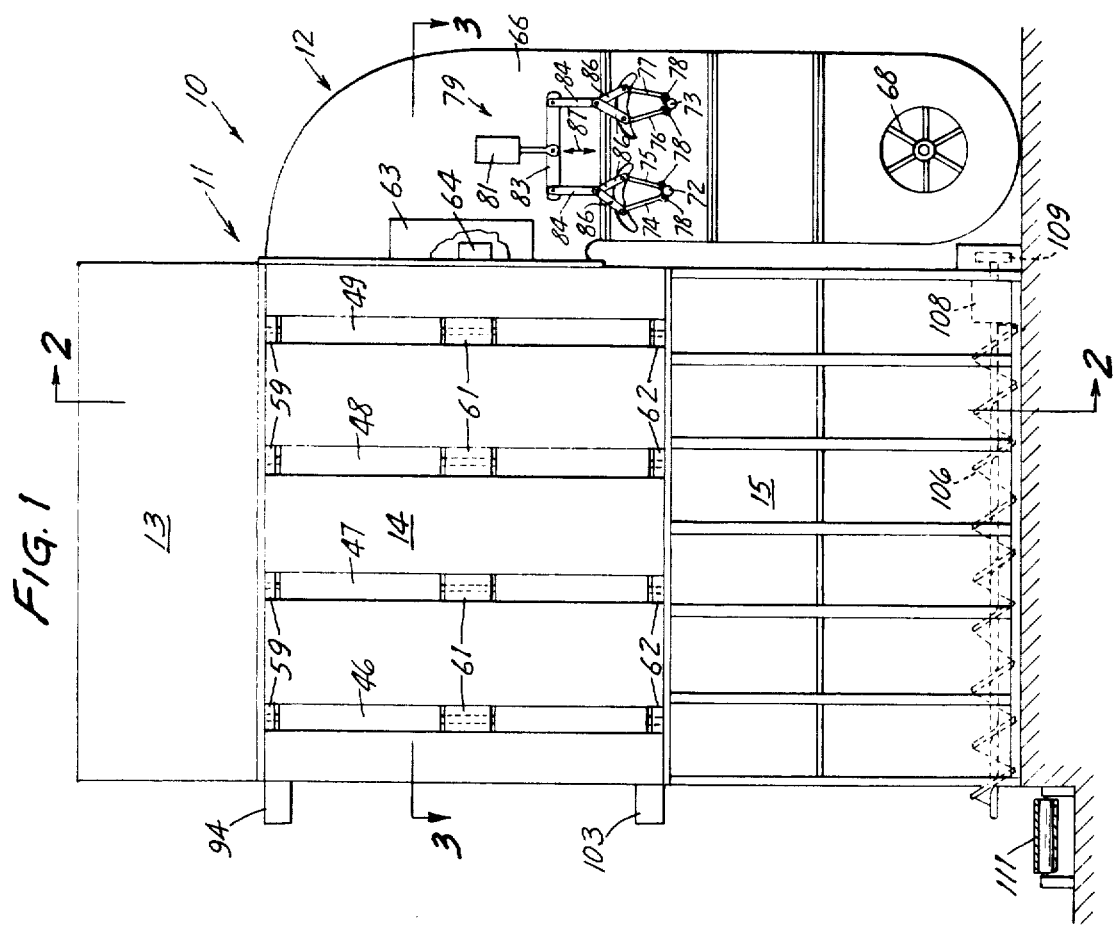
FIG. 1 is a side elevational view of the sequence batch dryer of the invention.

Referring to the drawing, there is shown in FIG. 1 the sequence batch dryer of the invention indicated generally at 10 operable to lower the moisture content of particulate material by drying batches of the material. The particulate material can be corn, small grains, millet, beans, rice, nuts or seeds. Other particulate materials, as diatomaceous earth, sugar, crystals, fruits, organic fertilizers, pelleted peat and the like, can be dried or dehydrated with apparatus 10. Apparatus 10 will be hereinafter described as an apparatus for drying grain. It is understood that other types of particulate materials can be dried in dryer 10. The drying process includes subjecting the particulate material to intermittently moving hot air to remove moisture from the material and subsequently cooling the material with cool air.

The dryer 10 has a generally upright housing 11 attached to a heating unit indicated generally at 12 operable to supply air to the chamber in the inside of housing 11.

Housing 11 has a wet holding section 13 adapted to receive and store grain. The grain can be supplied to the wet holding section with a conventional conveyor (not shown). The conveyor can be operated in response to the level of grain in the wet holding section so that the conveyor will keep the wet holding section filled with grain.

A drying section indicated generally at 14 is located below the wet holding section 13. Hot air from heating unit 12 is supplied to the drying section 14 to dry the grain. Also, cool air from unit 12 is supplied to the drying section to cool the grain after it has been subjected to the hot air. Details of the structure and controls in the drying section are hereinafter described.

Located below the drying section 14 is a dry holding or storage section 15. The grain that is dried in section 14 is dumped into the dry holding section. The dry grain is temporarily stored in section 15 during the drying cycle of a subsequent batch of grain. During drying of the subsequent batch, the grain in holding section 15 is removed without interference with the grain in section 14.

Figure 2:
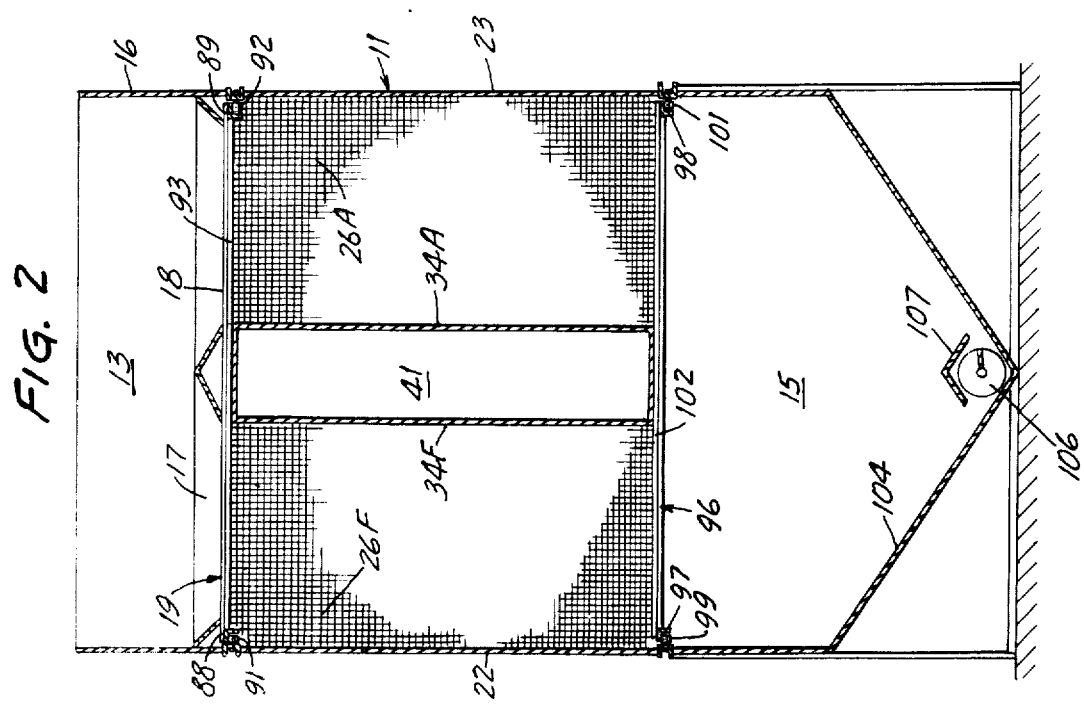
FIG. 2 is a sectional view taken along the line 2—2 of FIG. 1.

As shown in FIG. 2, the wet holding section 13 has an upwardly directed side wall 16 forming a chamber or bin for holding wet grain. The side wall 16 is attached to a bottom wall 17. Bottom wall 17 has a plurality of transverse openings 18 which allow the grain in section 13 to flow by gravity into drying section 14. A movable door or gate indicated generally at 19 functions to control the flow of grain from the wet holding section 13 to drying section 14.

Figure 3:
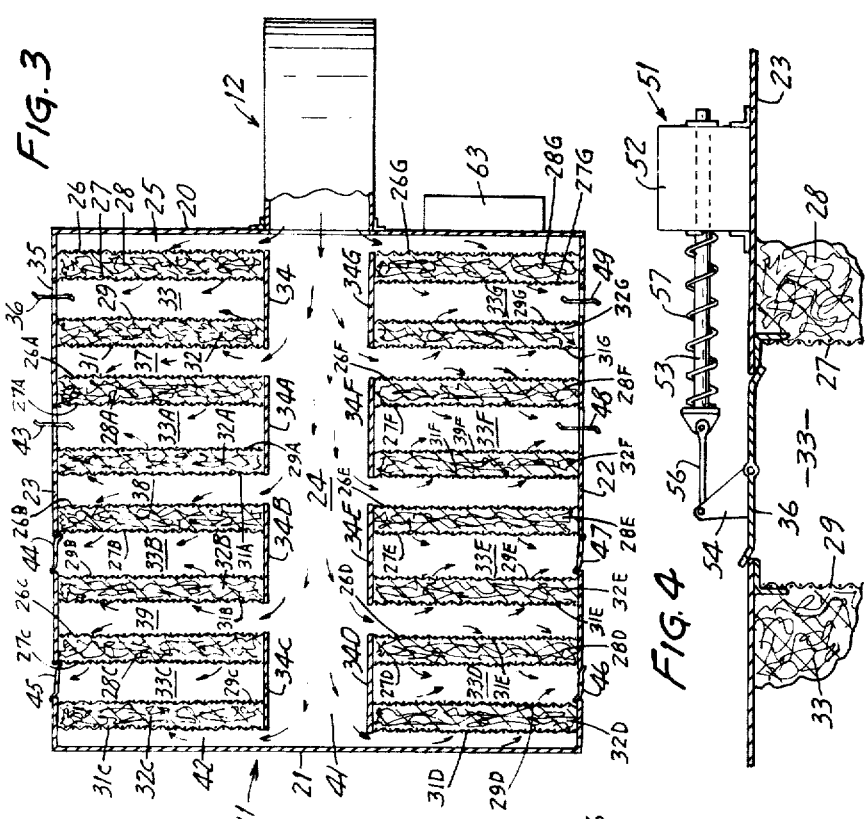
FIG. 3 is a sectional view taken along the line 3—3 of FIG. 1 showing some of the air exit doors open and one of the air exit doors closed.

Referring to FIG. 3, drying section 14 has a generally rectangular space defined by front upright wall 20, rear wall 21 and upright side walls 22 and 23. The walls 20–23 define chamber 24. The heating unit 12 is connected to the front wall 20 and functions to deliver hot and cold air to chamber 24. A plurality of perforated transverse walls 26,27 and 29,31 and 26A–G, 27A–G and 29A–G, 31A–G spaced from each other define separate grain holding spaces or columns. The wall may be of perforated metal or screen which permits air to flow through the walls to dry the columns of grain. Perforated transverse wall 26 is generally parallel to and spaced by a transverse space 25 from front wall 20. A perforated transverse wall 27 is laterally spaced from wall 26 and defines a column of grain 28. Preferably, the lateral space between walls 26 and 27 is 6 inches. Other spacing can be used. A second pair of perforated walls 29 and 31 defining a second column 32 are spaced from wall 27 by transverse space 33. The inner ends of walls 26,27, 29 and 31 and the inner end of space 33 are closed with an upright wall 34. A door or gate 36 sequentially opens and closes an opening 35 in the outside wall 23 to permit air to flow from the space 33 to the outside of housing 11 and block the flow of air from space 33. The blocked hot air in the columns of grain picks up moisture from the grain.

Seven additional pairs of drying columns formed by transverse perforated walls are located within chamber 24. These columns are identified with the same reference numerals as columns 28 and 32 and have subscripts A, B, C, D, E, F and G. The columns on the upper or right side of the housing are spaced from each other by transverse spaces 37, 38 and 39. Each of these spaces is open to a central plenum chamber 41. The pairs of columns on the left side of the housing 11 have similar spaces open to plenum chamber 41. Side wall 23 carries a plurality of upright doors 36, 43, 44 and 45 which permit access to the spaces 33, 33A, 33B and 33C respectively. In a similar manner, side wall 22 has doors 46, 47, 48 and 49 for opening spaces 33D, 33E, 33F and 33G respectively to the outside of housing 11. The interior walls 26, 27 and 34 of each pair of columns separate chamber 24 into an air inlet section or compartment and an air exhaust section or compartment.

Figure 4:
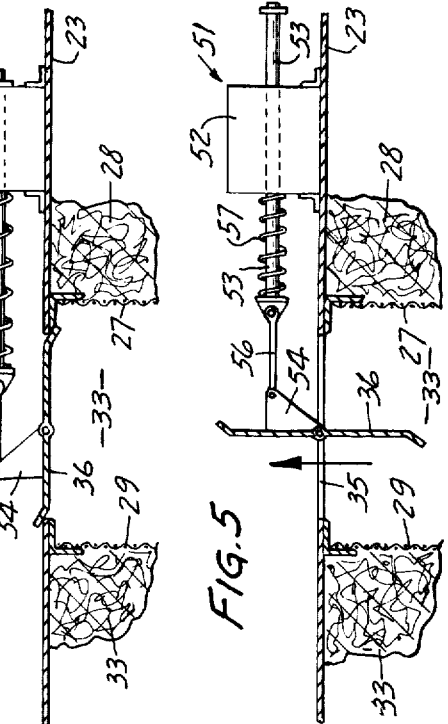
FIG. 4 is a sectional view showing the control structure of an air exit door with the door in the closed position.
Figure 5:
FIG. 5 is a sectional view similar to FIG. 4 with the door in the open position.

Referring to FIGS. 4 and 5, there is shown a control apparatus indicated generally at 51 for door 36. Each of the doors 43–49 has similar control apparatuses for opening and closing the doors. Alternatively, one control apparatus can operate each pair of associated doors. Control apparatus 51 comprises a solenoid 52 mounted on wall 23 adjacent the side of door 36. Other types of control means, as an air cylinder, fluid motor, gear box and the like can be used to move the doors. Solenoid 52 has a movable element or core 53. An outwardly directed arm 54 is secured to door 36. A spring 57 mounted on core 53 biases door 36 to the closed position. Spring 57 can be attached to arm 54 and a separate bracket mounted on side wall 23. A cable 56 attached to arm 54 and core 53 holds door 36 in the open position shown in FIG. 5 when solenoid 52 is energized, whereby the air in space 33 can move through opening 35. Door 36 has upper and lower pivots, as short rods, that are rotatable for movement about a generally upright axis and are mounted in bearings 59, 61 and 62, as shown in FIG. 1. The bearings can be oil soaked blocks attached to the framework of the housing. Other types of bearings can be used to rotatably mount the doors on the housing.

The solenoids 52 for all the doors are connected with suitable lines to a control panel 63. A timer 64 located within the control panel functions to sequentially operate the solenoids in pairs. As shown in FIG. 3, doors 36 and 43 are in the open position whereby heated air can flow through two pairs of columns 28, 32, 28A and 32A. Doors 48 and 49 are also open allowing air to flow through two additional pairs of columns. Doors 48 and 49 can be closed to limit the flow of air through the first two pairs of columns. Doors 44–47 are closed whereby the air in the remaining grain columns temporarily stops to accumulate the moisture from the grain. In the second sequence, doors 36 and 43 close while doors 44 and 45 are open. Doors 36, 43, 44, 45, 48 and 49 are closed. During the fourth sequence, doors 48 and 49 are open. Doors 36, 43, 44, 45, 46 and 47 are closed. This sequence is repeated during the heat cycle as determined by timer 64. Timer 64 is adjustable so that the time the pairs of doors are open can be varied to provide for maximum drying of the grain in the columns. For example, the pairs of doors can be opened for 20 second intervals. The doors remain closed for approximately 60 seconds. Other time intervals can be used to effect drying of the grain. During the cooling cycle, all of the doors 36, 43, 44, 45, 46, 47, 48 and 49 are open whereby all of the columns are cooled with air moving through the columns of grain. The cool air is supplied by the heating unit having the heaters or burners turned off. Alternatively, four doors 36, 43, 48 and 49 can be open during the cooling cycle as shown in FIG. 3. When these doors are closed the remaining four doors 44, 45, 46 and 47 are open.

Figure 6:
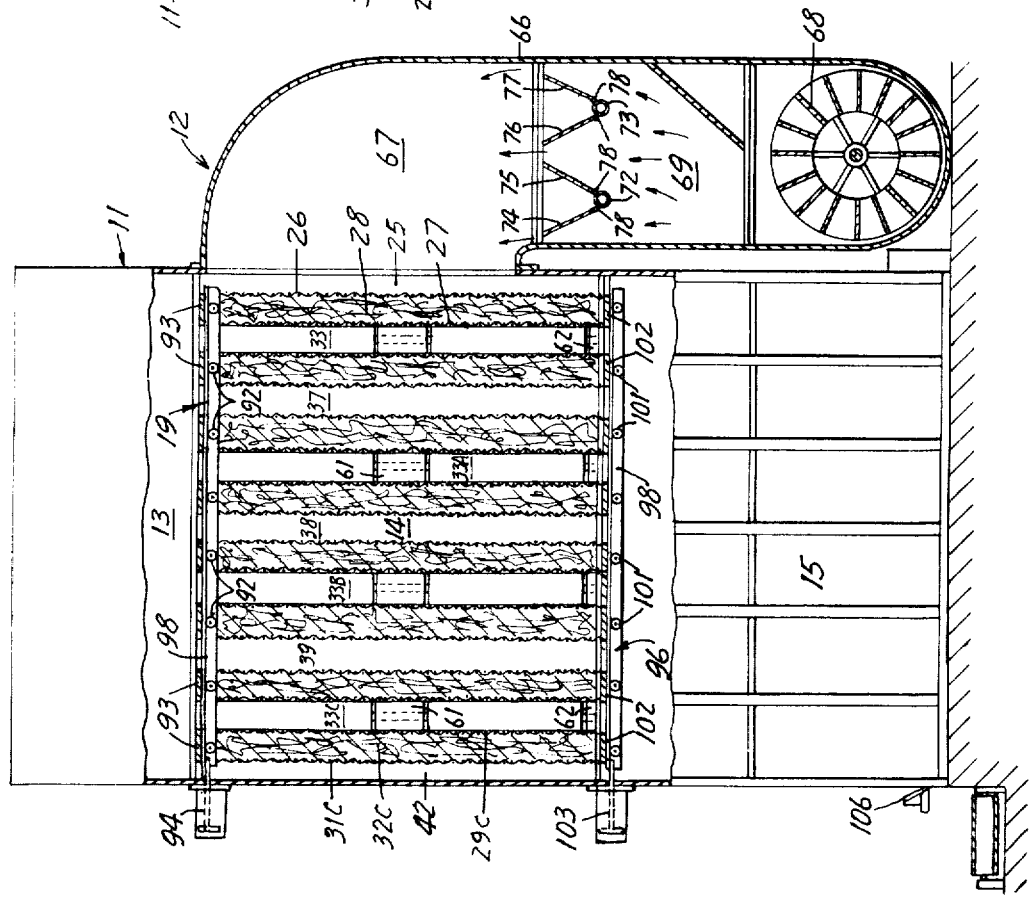
FIG. 6 is a side elevational view partly sectioned of the dryer of FIG. 1.

Referring to FIG. 6, heating unit 12 has an upright housing 66 forming a passage 67 to open to chamber 24. Attached to the lower end of housing 66 is a blower 68 operable to blow air, indicated by arrows 69, into the passage 67. Located in the mid-portion of passage 67 are a pair of gas burners 72 and 73 for heating the air moving in the passage 67. Burner 72 has a pair of profile plates 74 and 75. In a similar manner, burner 73 has a pair of outwardly directed profile plates 76 and 77. Hinges 78 connect the profile plates to the respective burners. Hinges 78 permit the profile plates to be folded in a generally side-by-side position to thereby move the profile plates to a position wherein they have a minimum of interference of air flowing through passage 67 during the cooling cycle of the dryer.

Referring to FIG. 1, a control mechanism indicated generally at 79 is used to control the angular positions of profile plates 74–77. When profile plates 74,75 and 76,77 are moved to side-by-side positions, they provide a minimum of interference or obstruction to the flow of air past the burners. This increases the efficiency of the blower 68 by increasing the cool air flow into plenum chamber 41. Control mechanism 79 comprises a motor, as a solenoid or hydraulic cylinder 81 having a movable element or rod 82. A cross bar 83 is pivotally connected at its midpoint to rod 82. Links 84 and 86 are connected to opposite ends of bar 83. The links have separate portions connected to the profile plates. The motor 81 is connected to control panel 63 and operates to move the cross bar in opposite directions, as indicated by arrow 87. This will selectively move the profile plates 74,75 and 76,77 to their divergent and side-by-side positions. Other types of control mechanisms can be used to control the angular positions of profile plates 74–77.

Referring to FIGS. 2 and 6, door 19 is movably mounted on the housing 11 to control the flow of grain from the wet holding section 13 into the drying column. Door 19 has a pair of longitudinal side rails 88 and 89 movably carried on a plurality of horizontally arranged rollers 91 and 92. The rollers 91 and 92 are rotatably mounted on the housing frame structure on opposite sides of the housing 11. Secured to side rails 88 and 89 are a plurality of transverse plates 93 of a size to cover the exit openings 18 of the bottom wall 17. Side rails 88 and 89, along with plates 93, are movable with a control unit 94 to a position to either open or close openings 18. Control unit 94 can be a solenoid, electric motor or fluid motor which is controlled with suitable controls in the control panel 63.

The bottom or discharge ends of the columns can be opened and closed with a door indicated generally at 96. Door 96 has a pair of side rails 97 and 98 movably mounted on rollers 99 and 101. Rollers 99 and 101 are rotatably connected to the frame structure of the housing 11. A plurality of transverse plates 102 are secured to the side rails and function as gates to close the discharge ends of the grain columns. A control 103 mounted on the rear wall is used to move the side rails 97 and 98 and plates 102 between their open and closed positions and thereby control the flow of grain from the drying columns into the dry holding section 15. Control 103 can be a solenoid, electric motor or fluid motor which is operatively connected to the control panel 63.

As shown in FIGS. 1 and 2, dry holding section 15 is defined by a wall 104 having a lower portion converging downwardly toward the longitudinal center of the dryer. A longitudinal auger 106 is located at the base of bottom wall 104 and is operable to move grain to an out conveyor 111. An inverted V-shaped shield 107 is located immediately above auger 106 to limit the pressure of the grain on the auger. A motor 108, shown in FIG. 1, connected to auger 106 with a drive assembly 109 is used to operate the auger, whereby grain is removed from the dry storage area 15 onto the out conveyor 111.

The sequence batch dryer 10 operates in the following manner. Wet grain, such as grain harvested with a combine, is placed into the wet holding section 13 by a conveyor or elevator. The conveyor is automatically controlled with suitable controls on panel 63. Pressure sensitive switches can be used at the discharge point of the conveyor to stop the conveyor when the wet holding section 13 is full of grain. A second pressure sensitive switch can be located in the wet holding section 13 to trigger the control 63 when there is an insufficient amount of grain in the wet holding section to fill the grain columns. This pressure switch can operate to stop the drying cycle of the entire machine.

When the wet holding section 13 is filled the control 94 is actuated to move the plates 93 to open positions whereby the grain in the wet holding section 13 will quickly flow into all of the grain columns until the columns are full. The plates 102 are in positions adjacent the bottom of the columns to prevent the grain from flowing into dry holding section 15. The plates 93 remain in the open position during the drying cycle. As moisture is removed from the grain, it will shrink. The reduction in volume of the grain is compensated by additional grain flowing into the column from the wet holding section 13. If the columns are not entirely full, there will be a loss of hot air through the top of the column thereby causing an uneven drying of the grain. At the end of the drying cycle and the beginning of the cooling cycle, the plates 93 are moved to the closed position, as very little grain shrinkage occurs during the cooling cycle. The plates 93 are moved on actuation of the control 94 connected to suitable controls in the panel 63.

When the grain columns in the dryer are full, a pressure sensitive switch or similar control located in the grain column signals the panel 63 to start the motor for blower 58. With the blower running, air is moved through the passage 67. The moving air in passage 67 will actuate a sail switch operable to turn on the burners 72 and 73. Fuel supplied to the burners 72 and 73 moves through a modulated gas control valve operatively connected to a temperature sensing element located in the heat air stream or plenum chamber 41. The temperature sensing element regulates operation of the burners to provide a uniform drying temperature. The temperature of the hot air supplied to chamber 41 can be adjusted by the operator.

Referring to FIG. 3, the heated air travels from heating unit 12 into the longitudinal plenum chamber 41. Doors 36 and 43 are open whereby the heated air flows through grain columns 28, 32, 28A and 32A. The remaining pairs of doors are all closed whereby heated air is accumulated in the grain columns to pick up moisture from the grain. The pairs of doors 44,45; 46,47 and 48,49 are operated in sequence whereby air sequentially flows through two pairs of grain columns. The amount of time that the heated air is allowed to flow through a given column is determined by the most efficient use of the heated air. For example, the air may be allowed to flow through the pairs of columns for 20 seconds and blocked for 60 seconds. The relatively stagnant hot air will pick up moisture to its maximum moisture holding ability. This moisture laden hot air will then be flushed from the dryer by opening the exit doors. As illustrated in FIG. 3, two pair of exit doors 43,36 and 48,49 can be simultaneously opened whereby hot air is moved through four pairs of columns and blocked in four pairs of columns. In the second sequence, the doors 43,36 and 48,49 are closed and doors 44,45 and 46,47 are opened to flush the moisture laden air from the pairs of columns associated therewith.

After a predetermined drying period is completed, burners 72 and 73 are automatically turned off. Control 81 is actuated to move the profile plates 74,75 and 76,77 in their side-by-side positions. With the profile plates 74,75 and 76,77 in their side-by-side positions, they provide a minimum of interference with the movement of air past the burners 72 and 73. This increases the air moving efficiency of the blower 68. All of the doors 36 and 43–49 can be opened whereby all of the grain columns are simultaneously cooled. Alternatively, the pairs of exhaust doors can be opened in sequence in a manner similar to the heating cycle whereby two pairs of grain columns are cooled.

The dryer is provided with a temperature sensing instrument located at one of the exit openings 35 for the doors. The instrument is operable to turn off the gas supply when the temperature of the exhaust air reaches a predetermined value. As the grain in the columns becomes drier, it releases less moisture. This allows the temperature of the air passing through the columns to rise as there is a direct relationship between the exhaust air temperature and the moisture content of the grain being dried. For example, with heated air input of 220° F. and an exhaust air temperature of 140° F., it has been found that the moisture content of the grain being dried is 12%. The blower 68 continues to operate to cool the dried grain to a temperature close to the outside temperature before it is discharged into the dry holding section 15.

A second temperature sensing element is used to determine when the grain is cool enough to unload. This element will signal the control panel to actuate control 103 and thereby open the gates 102.

When the gates 102 are opened, the grain in the columns will quickly flow into the dry grain section 15. When the grain columns are empty, the plates 102 are moved back to their closed positions, blocking the bottoms of the grain columns. The columns are then ready to be refilled with wet grain by the actuation of the control 94. This starts another drying cycle.

During the drying and cooling cycle occuring in drying section 14, two other actions are simultaneously occurring. The wet grain is being supplied to the wet holding area 13 and dry grain is being removed from the dry holding area 15. Auger 106 in the dry holding area 15 operates to move the grain onto a discharge conveyor 111. Conveyor 111 can be connected to a suitable storage bin or to a vehicle for transportation.

Both the loading and unloading of the grain columns are done within the confines of the housing 11. The dust, fine broken grain and other air pollutants are not allowed to escape into the environment. This results in a minimum of pollutants being discharged by the dryer.

In terms of method, the dryer 10 receives wet grain and temporarily stores the grain in the wet holding section 13. This grain is placed in generally upright separate columns having perforated walls which permit the drying and cooling air to flow through the columns. The grain is dried by directing hot air to the columns and subjecting the grain to the hot air. The hot air is permitted to sequentially flow through the columns to pick up moisture from the grain in the columns. The moisture laden hot air is rapidly flushed from the columns and replaced with relatively drier hot air which picks up further moisture from the grain in the columns. The sequential flow of air through the columns is achieved by sequentially blocking the flow of hot air leaving the columns.

Sequential drying of the grain in the columns is repeated until the moisture content of the grain is such that the grain can be stored without spoilage. When this moisture content is reached, the hot air in the columns is stopped and replaced with cool air. When the grain in the columns is cooled to approximately the ambient temperature, the blower 68 is turned off and the grain is dumped from the columns into the dry holding section 15. The dry grain is removed from the dry holding section 15 during the time a second drying cycle is repeated in the drying section of dryer 10.

The above description is directed to one embodiment of the method and apparatus of the invention. Changes and modifications in structure can be made without departing from the invention.

The embodiments of the invention in which an exclusive property or privilege is claimed are defined as follows:

1. A method of drying particulate material in a chamber comprising: storing particulate material in a first column in the chamber, storing additional particulate material in a second column in the chamber removed from said first column; directing hot air to said chamber, permitting sequential flow of hot air through substantially only said first column and then through substantially only said second column to dry the particulate material in said columns, terminating the flow of hot air to said chamber, and subjecting said first and second columns to cool air to decrease the temperature of the particulate material in said columns.

2. The method of claim 1 wherein: particulate material is stored in a plurality of first columns and a plurality of second columns, said hot air being sequentially moved through the first columns and second columns.

3. The method of claim 1 wherein: the sequential flow of hot air through the columns is achieved by sequentially blocking the flow of air leaving the chamber proximate the columns.

4. The method of claim 1 wherein: during the sequential flow of hot air through the chamber the hot air has limited flow in one of the columns and substantial flow through the other column.

5. The method of claim 1 including: providing sequential flow of cool air through said first column and then through said second column.

6. A method of drying particulate material comprising: storing particulate material in a first area in a chamber, storing particulate material in a second area in the chamber removed from the first area, directing hot air through said chamber, and causing sequential flow of hot air through substantially only said first area and then through substantially only said second area to dry the particulate material in said areas.

7. The method of claim 6 wherein: the first and second areas each have a plurality of particulate material drying spaces, said air sequentially flowing through the spaces of each area.

8. The method of claim 6 wherein: the sequential flow of air through the areas is achieved by sequentially blocking the flow of air leaving the chamber proximate the areas.

9. The method of claim 6 wherein: during the sequential flow of air through the first area and second area the air has limited flow in one of the areas and substantially free flow in the other area.

10. The method of claim 6 including: subjecting the first area and second area to cool air to decrease the temperature of the particulate material in said areas.

11. The method of claim 6 including providing sequential flow of cool air through said first area and then through said second area.

12. A method of drying particulate material in a chamber having an air inlet and a plurality of alternately openable and closeable air outlets, comprising:

storing particulate matter in said chamber in a plurality of columns with each column proximate an air outlet; introducing hot air into said chamber through said inlet; releasing hot air from said chamber sequentially and substantially mutually exclusively through said outlets by alternately opening and closing said outlets; terminating the flow of hot air to said chamber; and subjecting said columns to cool air to decrease the temperature of the particulate material in said columns.

13. The method of claim 12 wherein the step of subjecting said columns to cool air to decrease the temperature of the particulate material in the columns comprises: introducing cool air into said chamber through said inlet; and releasing cool air from said chamber by alternately opening and closing said outlets.

* * * * *